(12) United States Patent
Harris

(10) Patent No.: US 6,567,585 B2
(45) Date of Patent: May 20, 2003

(54) Z SHARPENING FOR FIBRE CONFOCAL MICROSCOPES

(75) Inventor: Martin Russell Harris, Richmond (AU)

(73) Assignee: Optiscan PTY LTD, Notting Hill (AU)

( * ) Notice: Subject to any disclaimer, the term of this patent is extended or adjusted under 35 U.S.C. 154(b) by 125 days.

(21) Appl. No.: 09/824,515

(22) Filed: Apr. 3, 2001

(65) Prior Publication Data

US 2001/0033713 A1 Oct. 25, 2001

(30) Foreign Application Priority Data

Apr. 4, 2000 (AU) ............................................. PQ6681
May 3, 2000 (AU) ............................................. PQ7305

(51) Int. Cl.[7] ............................. G02B 6/32; G02B 21/00
(52) U.S. Cl. ............................ 385/33; 385/48; 385/902; 359/368
(58) Field of Search ............................ 385/31, 33, 48, 385/115, 116, 117, 119, 902; 359/368, 369, 372

(56) References Cited

U.S. PATENT DOCUMENTS 5,926,592 A * 7/1999 Harris et al. ................... 385/33
6,388,809 B1 * 5/2002 MacAulay ................... 359/383
6,426,835 B1 * 7/2002 Endo et al. ................... 359/388

FOREIGN PATENT DOCUMENTS

EP  0 782 027  7/1989
WO  PCT/AU00/00117  2/2000

* cited by examiner

*Primary Examiner*—John D. Lee
*Assistant Examiner*—Sarah U Song
(74) *Attorney, Agent, or Firm*—Larson & Taylor, PLC

(57) ABSTRACT

A method and apparatus for image sharpening in confocal microscopy or endoscopy observation, the method comprising: collecting true confocal return light from an observational field of an object; focussing the true confocal return light into a core of a fiber wave-guide; collecting near confocal return light from a volume partially overlapping the observational field; focussing the near confocal return light so as to be transmitted principally in a cladding of the fiber wave-guide; separately detecting the true confocal return light and the near confocal return light to produce a true confocal output signal and a near confocal output signal; and adjusting the true confocal output signal on the basis of the near confocal output signal to substantially eliminate from the true confocal output signal a component due to the near confocal output signal; whereby the effective volume of the observational field is reduced and the resolution is effectively increased.

30 Claims, 12 Drawing Sheets

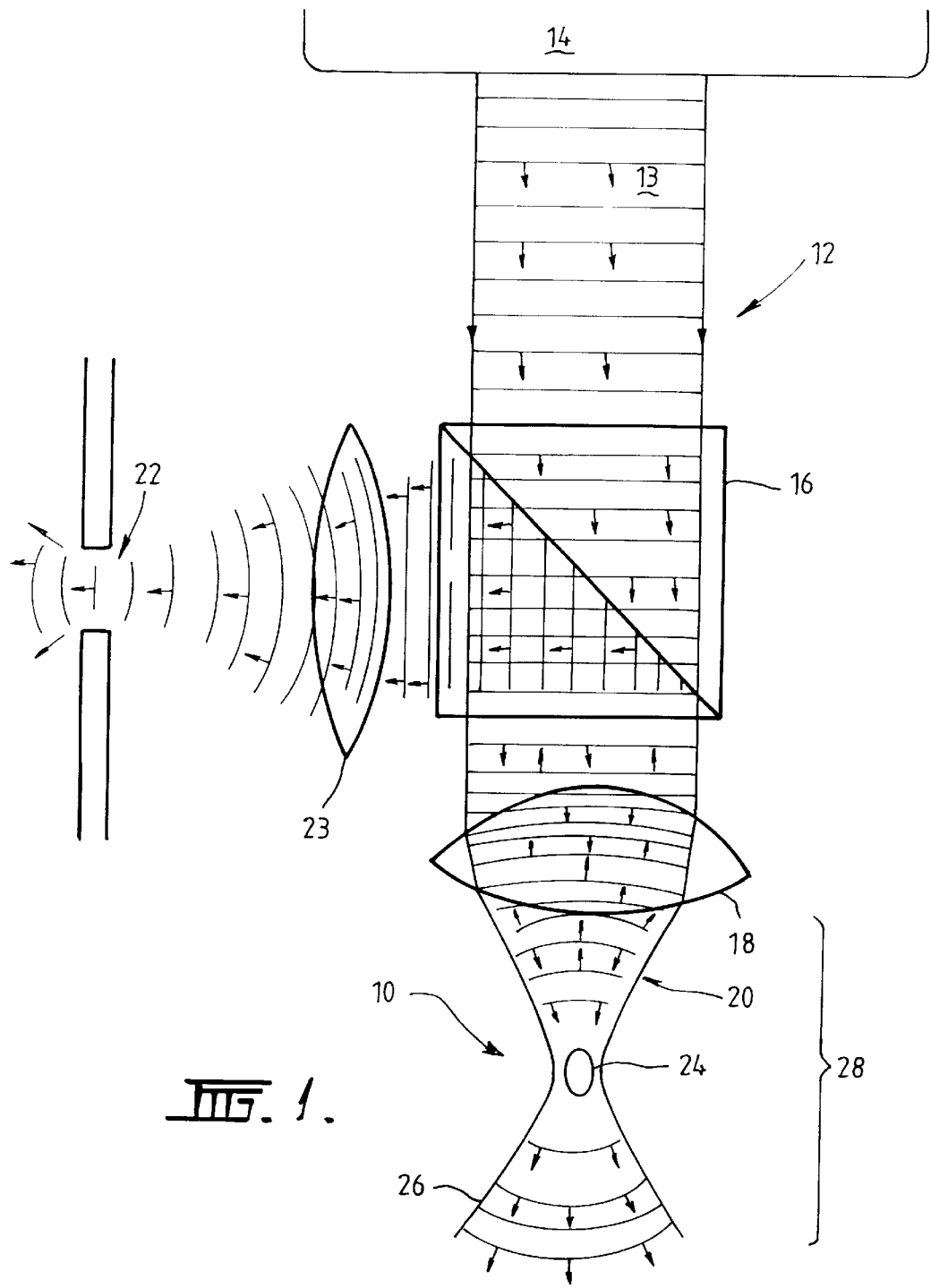

PRIOR ART

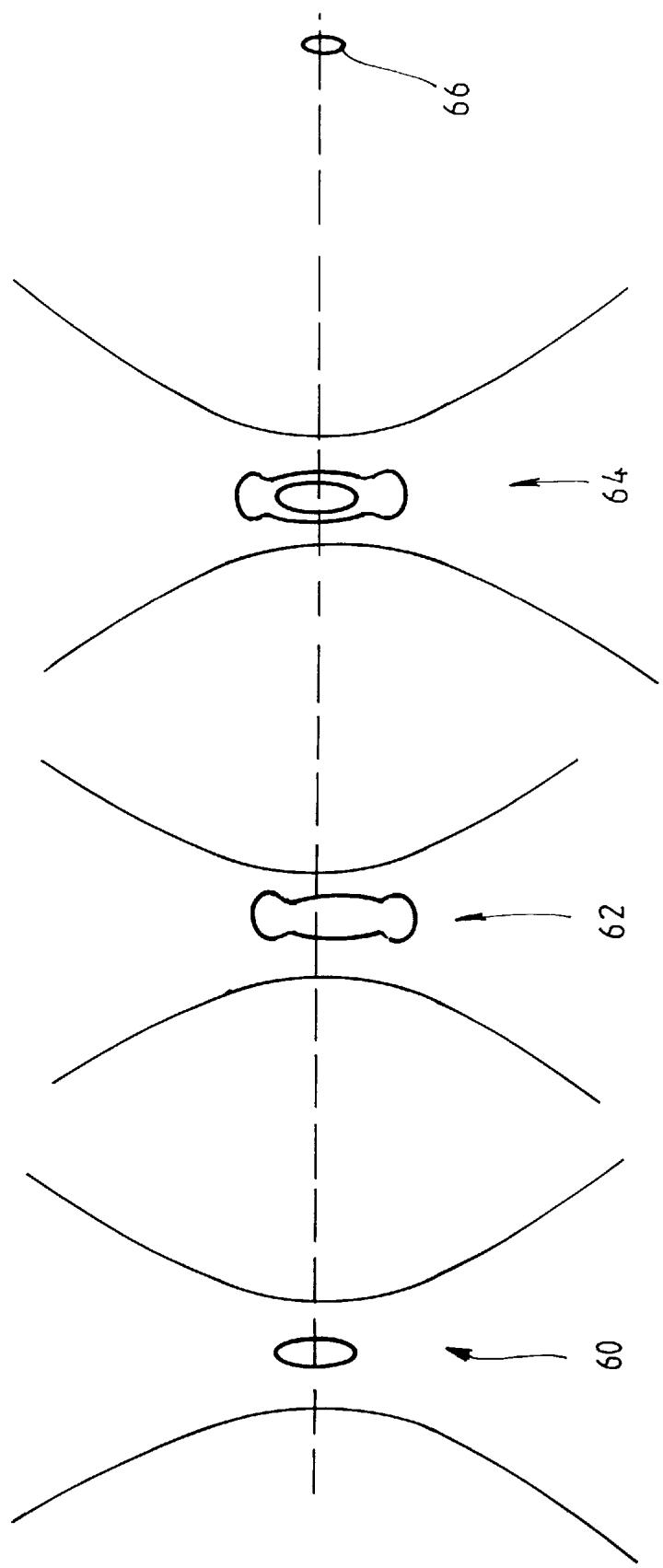

Z SHARPENING FOR FIBRE CONFOCAL MICROSCOPES

FIELD OF THE INVENTION

The present invention relates to an apparatus and method for performing image sharpening in confocal microscopy, of—in particular—the Z axis of confocal data sets in real time with a single scan. The present invention is of particular but by no means exclusive application in increasing the density of information storage of optical date storage devices, particularly of three dimensional digital data store devices.

BACKGROUND OF THE INVENTION

In confocal microscopy it is generally desirable to minimise the thickness of the focal plane section. This is achieved by reducing the return pinhole to the smallest size which will give a reasonable signal.

With a 1.4 NA oil immersion objective lens, the XY resolution is approximately 200 μm while the Z resolution is approximately 500 μm. This means that the voxels or boxels making up the image have a long axis that is 2.5 times the two orthogonal voxel dimensions. This is true for all laser scanning confocal microscopes (LSCMs) and affects all 3D reconstructions.

This ratio is greater for lower NA lenses and the result has a deleterious effect in 3D reconstructions. Rotations of images show a lack of resolution in the Z direction and perhaps more seriously, an artefact in which give a perception an anisotropy in views of tissues which include a Z dimension.

Image processing software can be used to improve the image. For example, in a first existing technique, Z sharpness is increased by concentrating on a voxel and then deconvolving it to a sharper value by subtracting from it a small proportion of the value of the voxel above it and below it.

A second existing technique utilises a similar principle in conjunction with XY sharpening algorithms. This is actually marketed as a synthetic aperture confocal system which can deconvolve sharp pictures from successive depth blurred low contrast brightfield images. However, it has been suggested that confocal data sets would also benefit from this approach. More sophisticated correction takes into account the brightness of pixels two levels above and below the focal plane being Z sharpened.

These are in effect a digital versions of unsharp masking techniques by means of which a correction is provided for the brightness of each individual voxel, which takes into account the brightness and 'spillover' addition of light from voxels above and below. The successful use of the aforementioned methods also depends on the operator having a fairly good understanding of the nature of the sample, the lens characteristics, the pixel sampling interval, the distance between successive image planes and other factors and entering these into the variables and chart of the algorithm.

A third existing technique that effectively achieves an identical Z sharpening result involves carrying out two separate scans of each plane, one scan being with the pinhole stopped right down and a second scan with the pinhole opened to about double the XY resolution optimum size. The second scan includes light from fluorescence from objects in the adjacent planes above and below and gives an analog sum of light intensities which can be used to obtain a correction factor equivalent to the digital correction algorithm used in the technique described above (in which one concentrates on a voxel and then deconvolves it to a sharper value by subtracting from it a small proportion of the value of the voxel above it and below it).

However, the above methods are time consuming and require a knowledge of the lens characteristics and sampling intervals. They require more than one scan to be made together with post acquisition processing. The software deconvolution (which is effectively digital unsharp masking) requires 3 or 5 scan depths to obtain corrections for 1 and 2 planes above and below the plane to be sharpened and, in some techniques, 2 or 3 scans with 2 or 3 different pinhole sizes.

Similarly, many methods have been proposed for high density digital storage using optically addressable elements within the three dimensional structure. Typical of these is the work by Rentzepis and by Min Gu. Previously proposed methods use confocal techniques to address the individual bit storage elements. The resolution in XY and Z of these methods has pretty thoroughly been established by Sheppard, Gu and others.

FIG. 1 illustrates the formation of a Gaussian Waist 10 when a $TEM_{00}$ beam 12 comprising a set of plane parallel wavefronts 13 from a laser 14 passes through a beamsplitter 16 (in which the first reflection is omitted for clarity) and objective lens 18. The lens 18 produces a convergent concentric wave front 20. If the Gaussian Waist 10 is focussed in a uniform fluorescent medium (not shown) then the points of re-emission of light which will return more than a given percentage of the excitation light energy through the return pinhole 22, after reflection and re-direction by beamsplitter 16 and focussing by lens 23, will constitute a volume 24 which is roughly football or elliptically shaped, symmetrically located in the waist 10. This elliptical volume 24 could be termed an isofluorescence boundary for confocal pinhole return. In fact for a perfect lens the 'football' has two haloes above and below it (not shown). These do not affect the discussion and have been omitted for clarity. The $1/e^2$ Gaussian profile is also indicated in this figure, as is the region 28 shown in subsequent figures and encompassing the Gaussian Waist 10 and environs.

Clearly the principle of unsharp masking involves the subtraction of return light from just above and just below the pixel to be sharpened in which the 'overlap' return light is taken away from the central pixel.

Two such prior art techniques (such as those employed in the first and second existing techniques discussed above respectively) are illustrated in FIGS. 2A and 2B, in which all the boxels are the same size. The pinhole is not altered but the 'overlap' required for the unsharp masking is obtained from the pixels in the scans on either side. FIG. 2A illustrates a prior art digital image sharpening technique using three scans at three separate levels within a specimen. In FIG. 2A, the plane to be sharpened is indicated at 30, and cross sections of the Gaussian Waist and confocal volume (or isofluorescence intensity voxel perimeter) for each of three scans are shown at 32, 34 and 36; the Gaussian Waist and confocal volume are respectively on, above and below the desired focal plane. In the sharpening procedure (see schematic representation at 38), a portion of both dotted volumes 40 and 42 (corresponding to the confocal volumes of the second and third scans 34 and 36) are removed from the central volume 44 (corresponding to the confocal volume of the first scan 32), leaving a sharpened voxel 46.

In the prior art technique illustrated in FIG. 2B, the central voxel 50 is sharpened by removing a portion of a 3×3 voxel matrix 52 from above and another 3×3 voxel matrix 54 from below the desired focal plane. The schematic image of FIG. 2B is shown undersampled from the Nyquist point of view to increase clarity.

FIG. 3 illustrates the traditional unsharp masking of the third existing technique discussed above, in which—after a first scan 60 is made with the pinhole stopped down—a second scan 62 is made with the pinhole opened but at the same focal plane. Next the pixel values for the image produced in the second scan 62 are subtracted—where an overlap exists—from the image produced in the first scan 60 (with the pinhole stopped down); the resulting difference signal contains the 'overlap' information 64 and is used to correct each of the pixels to be sharpened to produce the sharpened voxel 66.

SUMMARY OF THE INVENTION

It is an object of the present invention, therefore, to provide a method that avoids the necessity for multiple scanning and post acquisition processing.

It is another object of the present invention to provide a method and apparatus for reducing the Bit Error Rate (BER) of reading and of increasing the storage capacity (typically measured in gigabits per cubic millimeter) of a data storage material.

In a first broad aspect, therefore, the present invention provides a method of image sharpening in a confocal microscopy or endoscopy observation, comprising:

collecting true confocal return light emanating from an observational field of an object;

focussing said true confocal return light into a core of a fiber wave-guide;

collecting near confocal return light from a volume partially overlapping said observational field and thereby defining an overlap volume;

focussing said near confocal return light into said fiber wave-guide so as to be transmitted principally in a cladding of said fiber wave-guide;

separately detecting said true confocal return light and said near confocal return light to produce a true confocal output signal and a near confocal output signal; and adjusting said true confocal output signal on the basis of said near confocal output signal to substantially eliminate from said true confocal output signal a component due to said near confocal output signal;

whereby the effective volume of said observational field is reduced and the resolution of said observation is effectively increased.

Preferably said overlap volume is in the Z axis of said observational field.

Preferably said true confocal return light and said near confocal return light are collected and focussed by means of a light condenser. More preferably said light condenser comprises a lens or a compound lens.

In one embodiment, adjusting said true confocal output signal comprises subtracting said near confocal output signal from said true confocal output signal.

This may constitute an over-correction, but the component of the near confocal signal due to light from other than the overlap volume will be small compared to the component of the near confocal signal due to light from the overlap volume, so the adjustment of the true confocal output signal will nevertheless improve, overall, the resolution of the observation.

More preferably said method includes absorbing or otherwise excluding higher angle rays from said near confocal return light, whereby said near confocal return light comprises principally light from said overlap volume.

Preferably said method includes excluding higher angle rays from said near confocal return light by transmitting said near confocal return light through a region of said fiber provided with an outer cladding with a refractive index such that said higher angle rays are transmitted into said outer cladding while lower angle rays of said near confocal light are internally reflected and thereby retained in a glass inner cladding of said fiber.

Preferably said method includes absorbing light transmitted within said outer cladding.

In one embodiment, said fiber is a single moded optic fiber with a glass inner cladding and an outer cladding having a low refractive index such that modes of said near confocal return light in said glass cladding are normally internally reflected by said outer cladding, wherein said method includes cooling said outer cladding within a region of said fiber so that within said region said higher angle rays are transmitted into said outer cladding. More preferably said outer cladding comprises silicone rubber.

Preferably said outer cladding is surrounded at least partially within said region with an optically absorbing medium.

Preferably said cooling is by means of a Peltier effect cooler.

In one embodiment, said object is a data storage medium.

In a second broad aspect, the present invention provides an image sharpening apparatus for use in making a confocal microscopy or endoscopy observation, comprising:

a light condenser for collecting true confocal return light emanating from an observational field of an object, for focussing said true confocal return light into a core of a fiber wave-guide, for collecting near confocal return light from a volume partially overlapping said observational field and thereby defining an overlap volume, and for focussing said near confocal return light into said fiber wave-guide so as to be transmitted principally in a cladding of said fiber wave-guide;

detection means for detecting said true confocal return light and said near confocal return light, and to produce respectively a true confocal output signal and a near confocal output signal; and signal processing means for adjusting said true confocal output signal on the basis of said near confocal output signal to substantially eliminate from said true confocal output signal a component due to said near confocal output signal;

whereby the effective volume of said observational field is reduced and the resolution of said observation is effectively increased.

Preferably said overlap volume is in the Z axis of said observational field.

Preferably said light condenser comprises a first light condenser and a second light condenser, wherein said first light condenser is arranged to collect and focus said true confocal return light and a second light condenser is arranged to collect and focus said near confocal return light.

More preferably said light condenser comprises a lens or a compound lens.

Preferably said detection means comprises a first detector and a second detector, wherein said first detector is arranged to detect said true confocal return light and said second detector is arranged to detect said near confocal return light.

In one embodiment, said signal processing means is operable to adjust said true confocal output signal by subtracting said near confocal output signal from said true confocal output signal.

Preferably said apparatus includes absorption means for extracting and absorbing higher angle rays from said near confocal return light, whereby said near confocal return light comprises principally light from said overlap volume.

Preferably said fiber has an glass inner cladding and a region provided with an outer cladding with a refractive index such that within said region higher angle rays of said near confocal return light are transmitted into said outer cladding while lower angle rays of said near confocal light are internally reflected and thereby retained in said glass cladding.

In one embodiment, said fiber is a single moded optic fiber with a glass inner cladding and an outer cladding having a low refractive index such that modes of said near confocal return light in said glass cladding are normally internally reflected by said outer cladding, wherein said apparatus includes means for increasing said refractive index of said outer cladding within a region of said fiber so that within said region said higher angle rays are transmitted into said outer cladding. More preferably said outer cladding comprises silicone rubber.

Preferably said outer cladding is surrounded at least partially within said region with an optically absorbing medium.

Preferably said means for increasing said refractive index of said outer cladding within a region comprises a cooling means, and more preferably a Peltier effect cooler.

Preferably said apparatus includes optical path varying means for varying the optical path of said true and near confocal return light to compensate for variations in said optical path due to changes in the depth of said observational field within said object, said optical path varying means having regions of greater and lesser optical path, whereby said optical path varying means can be located with a region of lesser optical path in said optical path when said observational field is deep within said object and with a region of greater optical path in said optical path when said observational field is less deep within said object.

Preferably said optical path varying means comprises an optical wedge.

In a third broad aspect, the present invention provides a data reading apparatus for reading data from a data storage medium, including the image sharpening apparatus described above.

BRIEF DESCRIPTION OF THE DRAWINGS

In order that the present invention may be more clearly ascertained, a preferred embodiment will now be described, by way of example, with reference to the accompanying drawing, in which:

FIG. 1 illustrates the formation of a Gaussian Waist;

FIG. 3 is a schematic view of a prior art Z sharpening technique that employs a traditional unsharp masking technique;

DETAILED DESCRIPTION

Figure 2A:
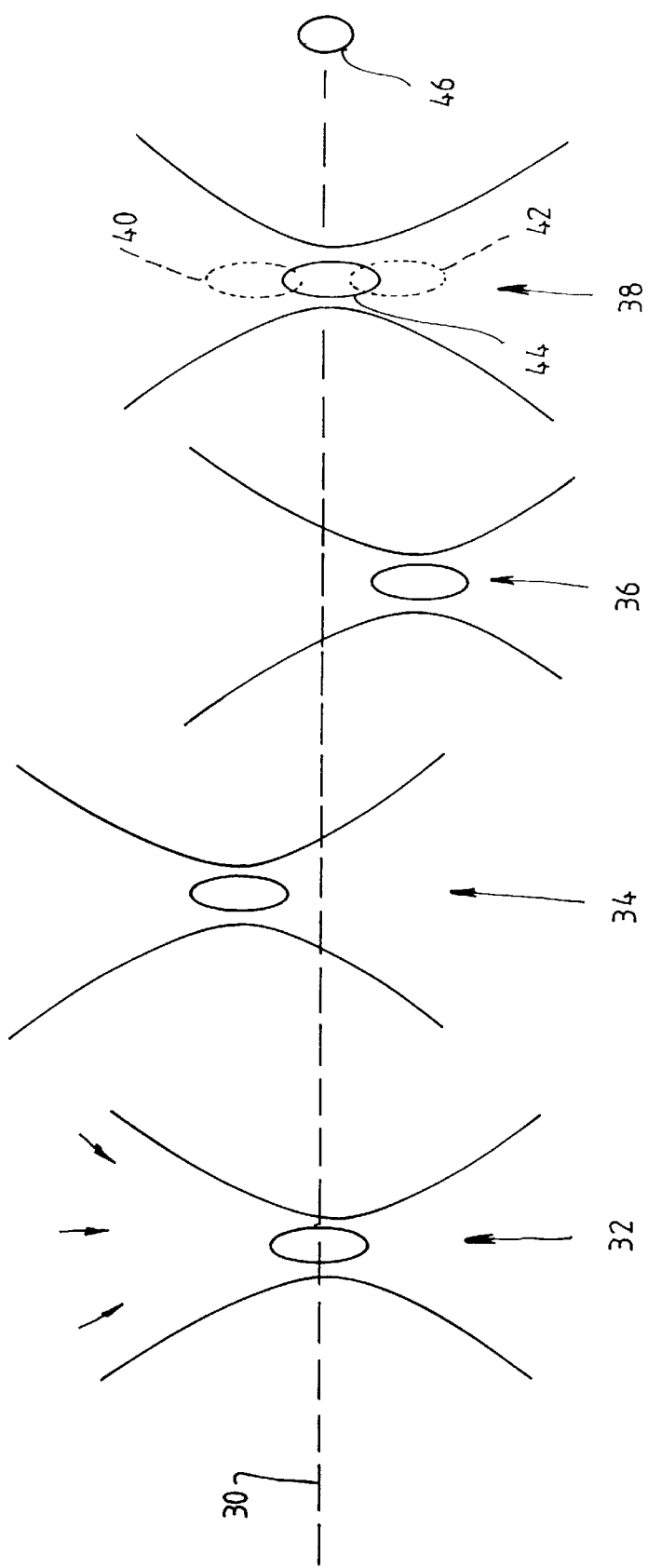
FIG. 2A is a schematic view of a prior art Z sharpening technique in which each voxel is sharpened by subtracting from it a small proportion of the value of the voxel above it and below it.
Figure 2B:
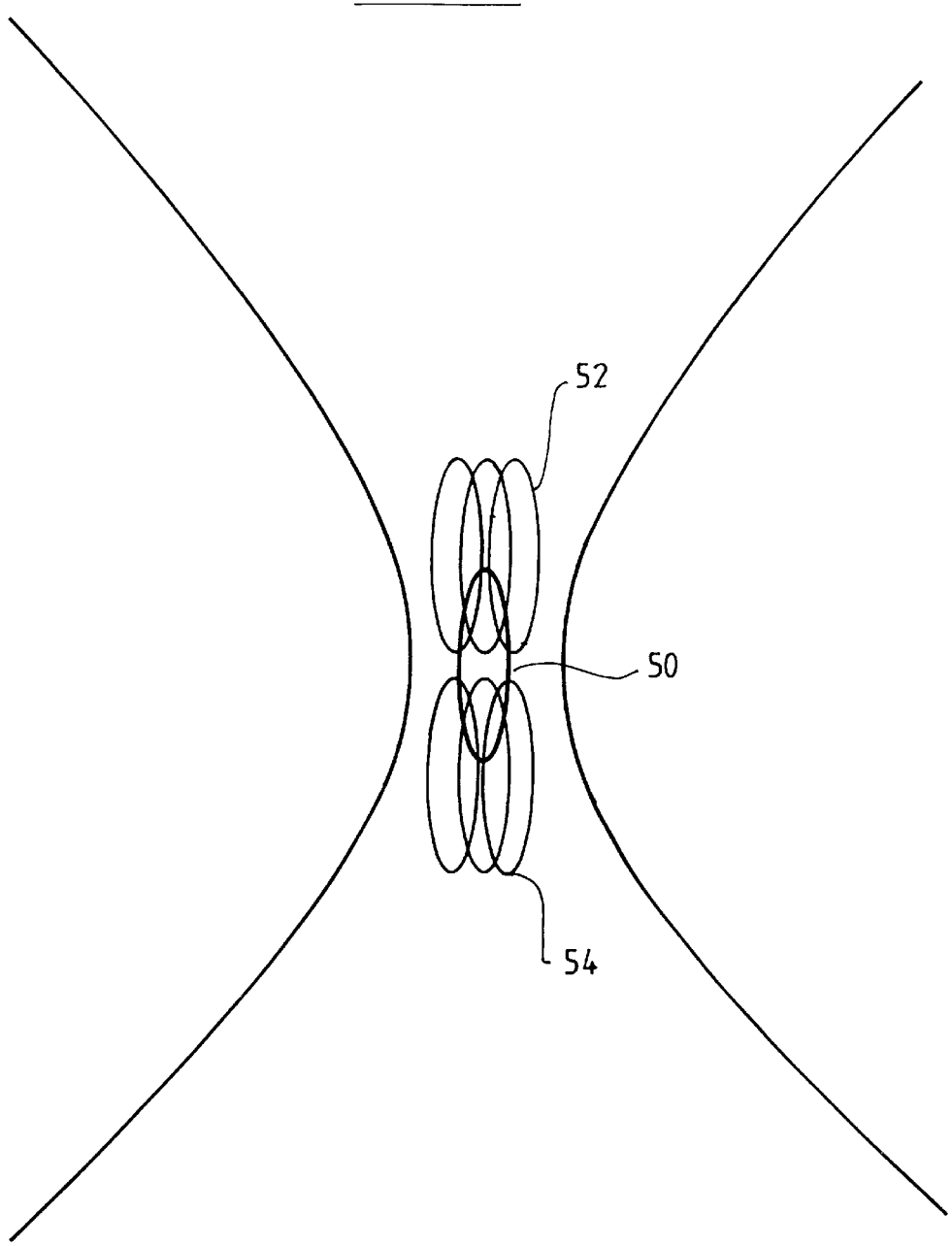
FIG. 2B is a schematic view of a prior art Z sharpening technique similar to that shown in FIG. 2B, but in conjunction with XY sharpening algorithms.
Figure 4:
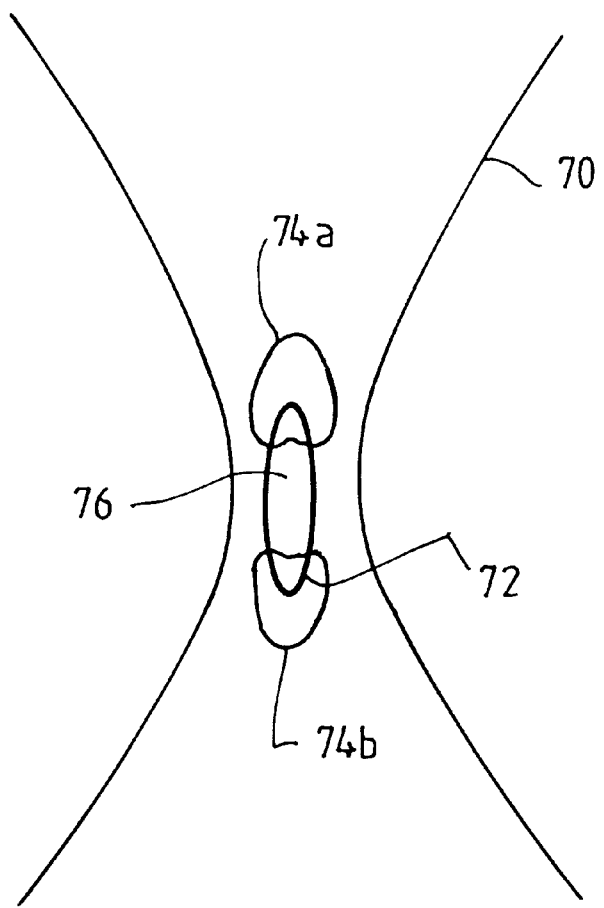
FIG. 4 is a schematic view illustrating a preferred embodiment of the present invention.

Referring to FIG. 4, in a Z sharpening method according to a preferred embodiment of the present invention, the near confocal fluorescence or reflection is conveyed back simultaneously via separate coded channels with the one fiber to photodetectors and the intensity converted to an electric signal. The voltage produced from these other channels can be convolved with the confocal return channel voltage and an on-line single scan sharpened image can be generated. FIG. 4 illustrates the volumes around the Gaussian Waist from which confocal and near confocal fluorescence originates and how the overlap can be used for voxel sharpening. In this figure are shown the Gaussian Waist 70, the fluorescence 72 that goes back into the core of the fiber (not shown), the fluorescence 74a,b that goes into the near confocal channel, and the sharpened voxel 76 (i.e. where there is no overlap between the 'true' confocal fluorescence 72 and near confocal fluorescence 74a,b).

Figure 5:
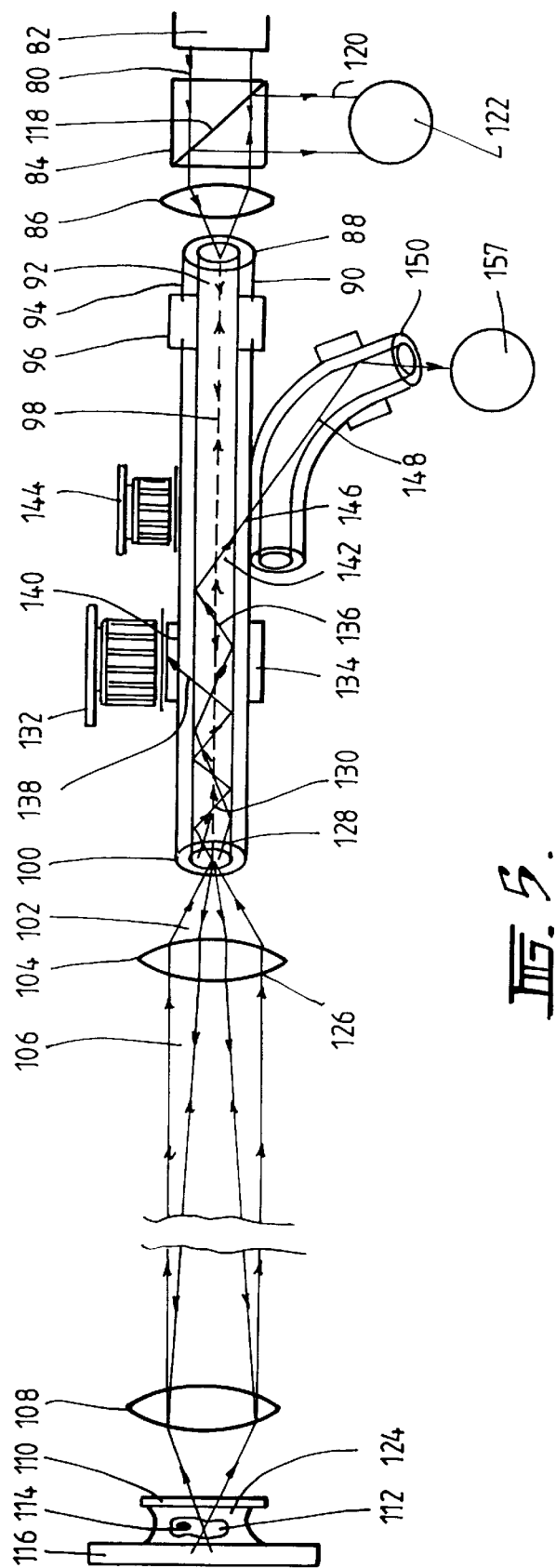
FIG. 5 illustrates the relative locations of the Gaussian Waist, the core and near confocal fluorescences, and the sharpened voxel according to a preferred embodiment of the present invention;.

FIG. 5 is a schematic view of an apparatus according to an embodiment of the present invention (though for simplicity using a long path variable pinhole). In this embodiment the light 80 from laser 82 passes through beamsplitter 84 and is focussed by lens 86 into the core 98 at the tip 88 of a silicone rubber clad single moded optic fiber 90. The cladding modes in the glass cladding 92 are internally reflected by the low refractive index silicone rubber 94 but are absorbed by cladding mode stripper 96. The light is transmitted along the core 98 of the fiber 90 to the end 100 of the fiber 90, from which it emerges as a beam 102 of low NA which is reflected by lens 104 to a beam 106 which is intercepted by lens 108 and focussed through a coverslip 110 to a spot (or Gaussian Waist) 112 within a specimen in the form of a cell 114 on a slide 116. The light re-emanating from "focal volume" of the Gaussian Waist 112 returning through lens 108 retraverses the same optical path as the excitation light 106. It is reconverged by lens 104 to enter back into the core 98 of the optic fiber 90 at the end 100 and retraverses the core 98 to the other end 88 at which point it remerges and is collimated by lens 86.

Passing to the beamsplitter 84 the beam is reflected by the dichroic or semireflective layer 118 to emerge as a beam 120 which impinges on photomultiplier 122. The electrical signal from this photomultiplier tube 122 provides the 'true' confocal data set bitmap information. Fluorescence which is generated above 124 or below the focal plane arrives back at lens 104 with a degree of lateral displacement 126 which is proportional to the distance of the light returning body from the focal plane (Gaussian Waist 112). Because of this lateral displacement it is converged to the core 98 at the tip 100 of the fiber 90 at angles which are unable to be carried as bound modes within the core 98. The light is therefore carried as cladding mode rays 128 and 130.

Ray 128 came from a plane which was closer to the Gaussian Waist 112 than ray 130. Ray 128 is therefore carried as a cladding mode of lower angle than ray 130. A Peltier effect cooler 132 reduces the temperature of an optically absorbing medium 134 surrounding the fiber 90 and also cools the silicone rubber and the glass in that vicinity 136. The silicone rubber has its refractive index increased by the cooling (relative to the silica) and the critical angle at the interface 138 will no longer guide the higher angle ray. Ray 130 therefore passes through the silicone rubber and is absorbed at 140. Ray 128 which is carried by the fiber 90 at a shallower glancing angle passes through area 136 and proceeds to area 142 where the fiber 90 is cooled by a second Peltier effect device 144, operated at a temperature that is lower than that of the first Peltier device 132.

This then allows the light to escape from the glass into the silicone rubber at 146 where it can proceed into a second fiber 148. The light then proceeds along this fiber to the tip 150 from which it emerges and impinges on the photosensitive surface of a photomultiplier tube 152. It is desirable that all cladding mode light is extracted and directed to this photomultiplier tube 152. The electrical output from photomultiplier tube 152 quantifies the intensity of this light. The two temperatures of the Peltier effect devices 132 and 144 can be varied to control the mode fraction which passes to photomultiplier tube 152.

Figure 6:
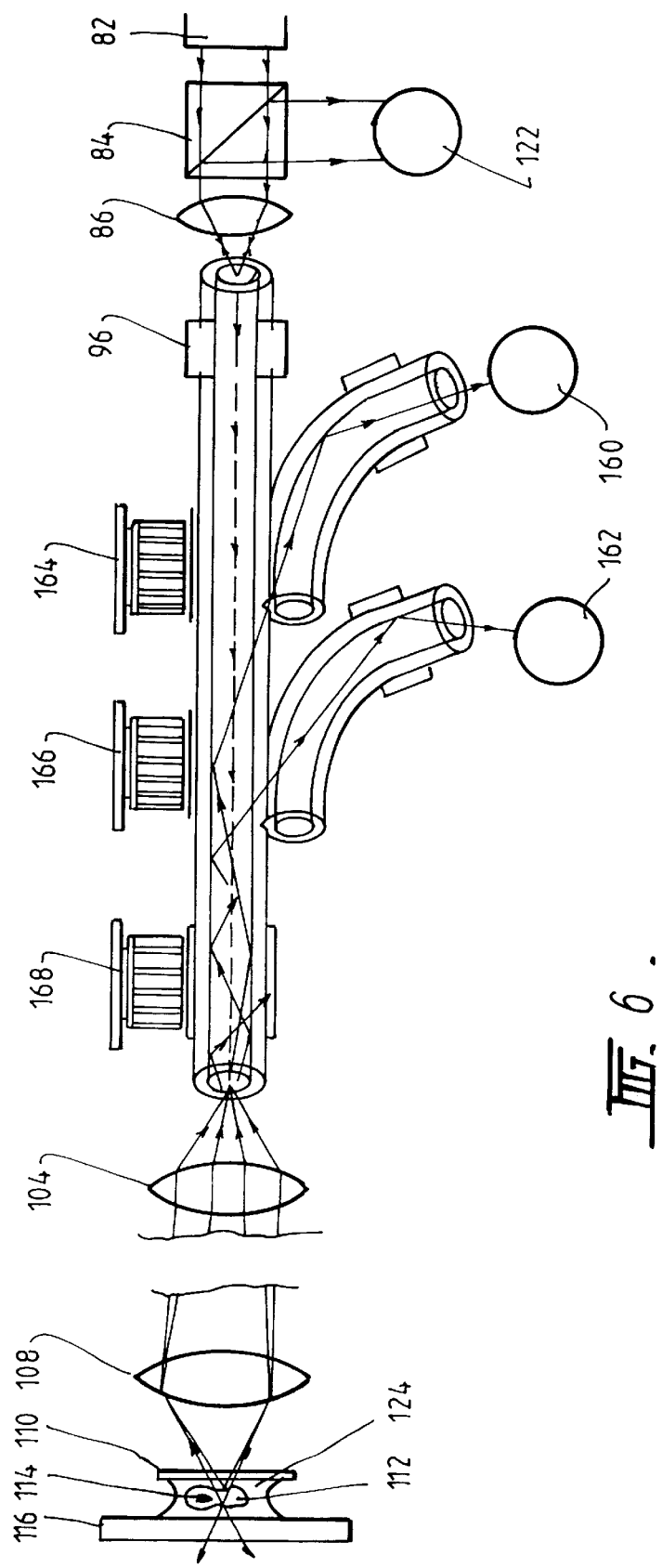
FIG. 6 is a schematic view of a Z sharpening confocal microscope according to a preferred embodiment of the present invention.

FIG. 6 illustrates a variation of the embodiment of FIG. 5, in which two photomultipliers 160 and 162 are used in conjunction with three Peltier Coolers 164, 166 and 168. The temperature of the Peltier coolers is T(P164)<T(P166)<T(P168). The principle of operation is similar to the embodiment of FIG. 5 except that light from two separate successive planes above and below the focal plane is sampled by the two photomultiplier tubes 160 and 162, as follows.

Figure 7:
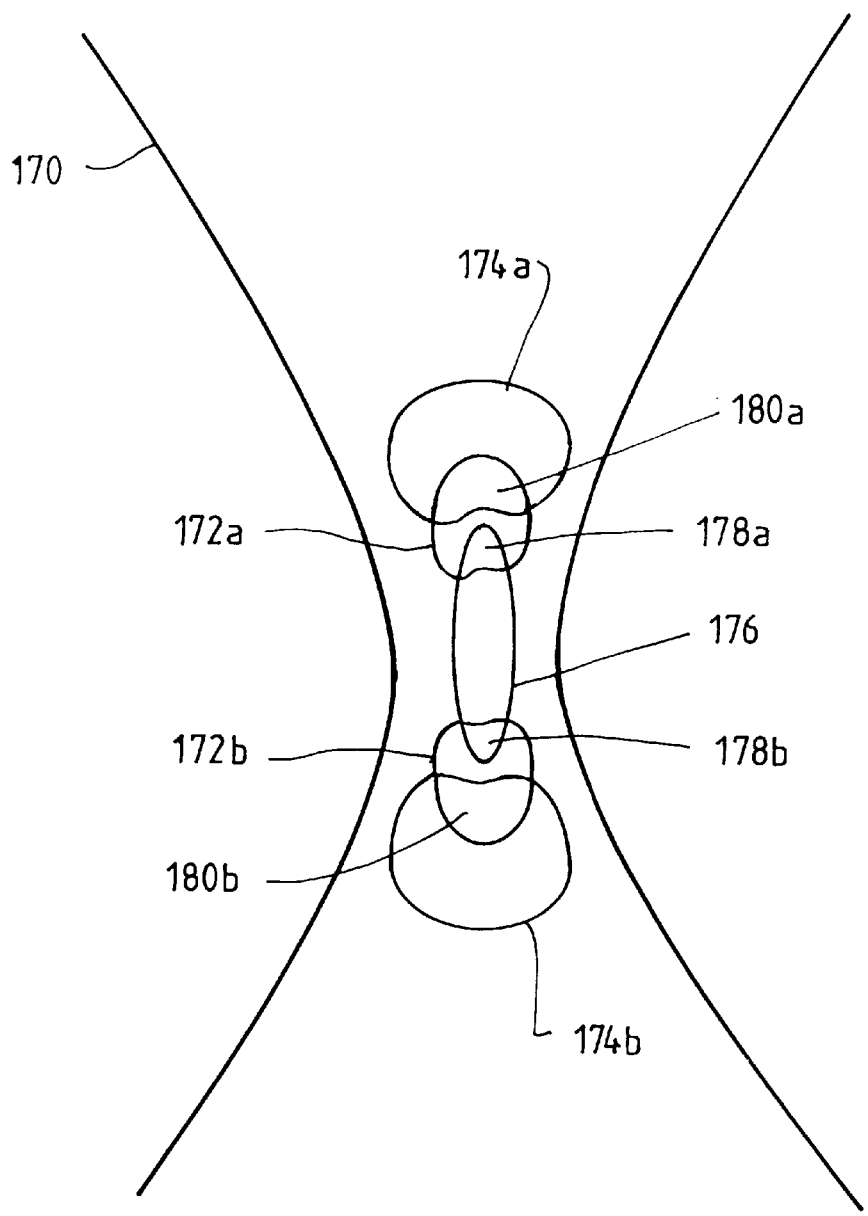
FIG. 7 is a schematic view of a Z sharpening confocal microscope according to a further preferred embodiment of the present invention.

FIG. 7 indicates the areas (representing volumes) within the Gaussian Waist 170 from which the sets of modes going to the photomultiplier tubes 160 and 162 of the embodiment of FIG. 6 are derived. Photomultiplier tube 160 derives light from the areas 174a,b corresponding to the lowest order modes, while photomultiplier tube 162 derives light from the areas 174a,b corresponding to the next set of modes. In carrying out the analog computation a portion of the output from photomultiplier tube 160 is subtracted from the 'true' confocal signal from area 176 (from photomultiplier tube 122), which effectively removes the signal from the overlap areas 178a,b and thereby reduces the depth of field of the image obtained. A smaller fraction of the output of photomultiplier tube 162 is added to the 'true' confocal signal from area 176, to sharpen the overlap areas 180a,b. The temperatures of the three Peltier effect coolers 164, 166 and 168 are optimized to give a best sharpening effect.

Figure 8:
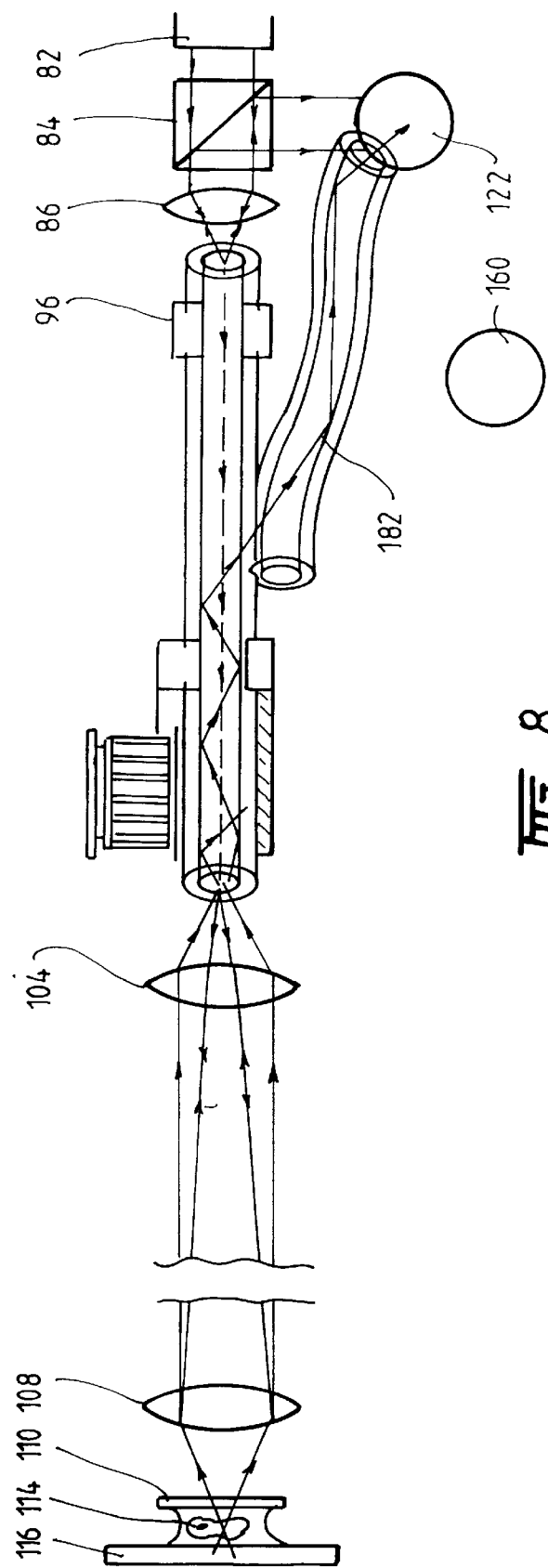
FIG. 8 is a schematic view of a confocal microscope without Z sharpening, modified from the apparatus of FIGS. 6 or 7.

FIG. 8 illustrates the change which would be made to convert the system into a conventional variable pinhole LSCM. The cladding mode coupler fiber 182 is relocated from photomultiplier tube 160 and its output is allowed to fall on photomultiplier tube 122. Electrical output addition of the two photomultiplier signals is also possible.

The above approach can also be employed to provide a method and apparatus by again utilising the return light from the regions which are slightly out of focus of a reading lens. According to the method of this embodiment, a part of the signal from these slightly out of focus regions is convolved or subtracted from the signal which has been generated by the confocal return light. The separation of the "near confocal" return light from the "true" confocal return is achieved using modes in an optical fiber.

Figure 9:
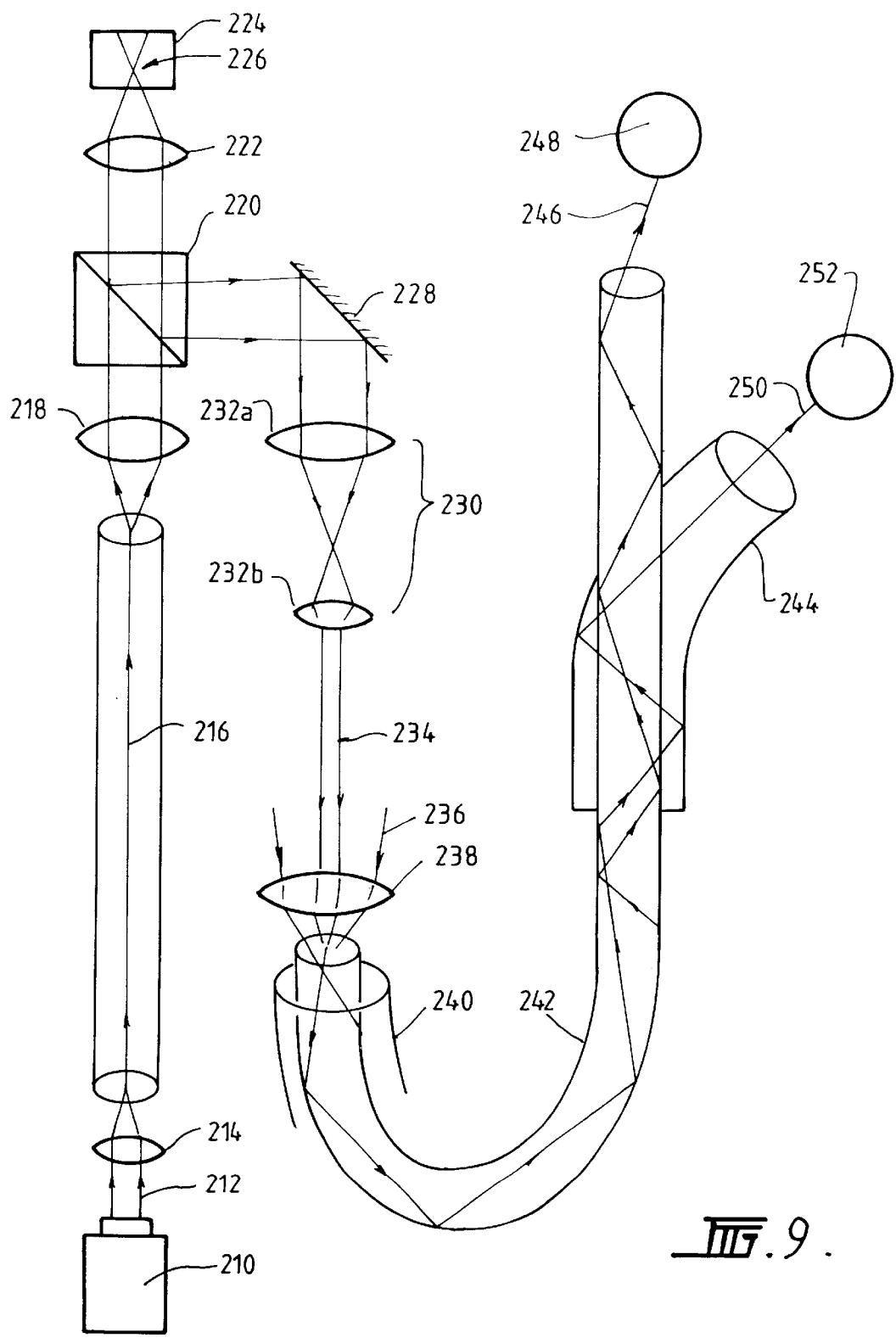
FIG. 9 is a schematic representation of a data reading apparatus according to another preferred embodiment of the present invention.

FIG. 9 is a schematic representation of a data reading apparatus according to this embodiment of the invention, in which laser 210 generates laser beam 212, which is focussed by lens 214 into single mode optic fiber 216. The light 212 exits fiber 216, is collimated by lens 218 and directed into beam splitter 220. One portion of the light 212 is focussed by lens 222 onto digital data storage medium 224; the interrogated spot lies at focal point 226.

Return light from a digital data storage medium 224 is directed by beam splitter 220 to mirror 228, which directs the light through beam compressor 230 (including lenses 232a and 232a). Both true confocal rays 234 and near confocal rays 236 emerging from the beam compressor 230 are focussed by lens 238 into silica multimode fiber 242, encased in low refractive index silicone cladding 240. Towards the end of fiber 242, higher (relative to cladding 240) refractive index cladding 244 strips out higher order modes; the remainder of the light (confocal return light 246) is detected by photodetector 248, which the higher order modes (near confocal return light 250) is detected by photodetector 252.

Note that this method can operate in reflected light or in fluorescence mode, and in single photon (linear) mode or in non linear (multiphoton molecular fluorescence) mode. The method can be used with the one fiber delivering the laser light and returning the signal or with a separate fiber returning the signal (see FIG. 9). It can be made to operated in reflection (the preferred mode, as depicted in FIG. 9) or in transmission.

Figure 10:
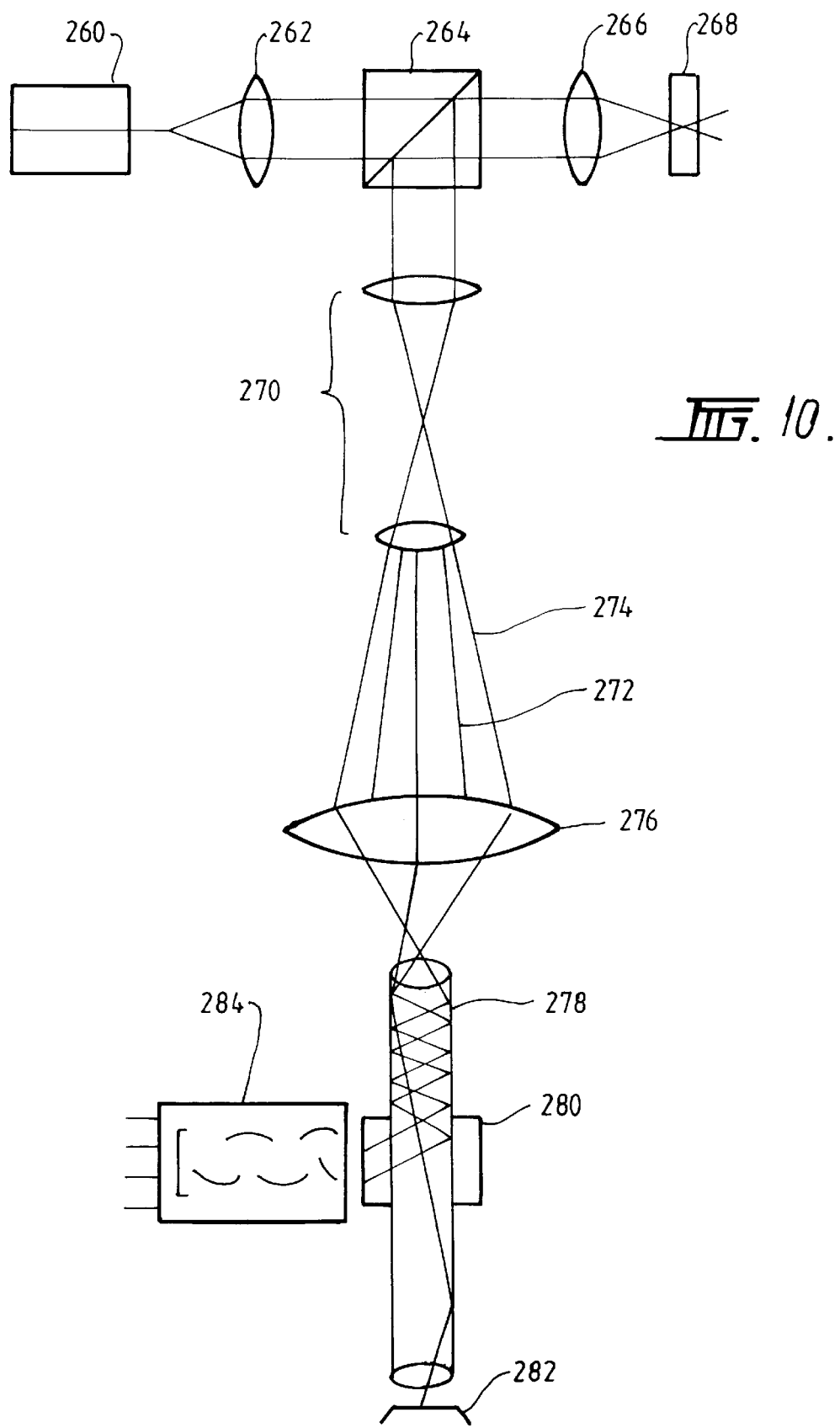
FIG. 10 is a schematic representation of another data reading apparatus according to a further preferred embodiment of the present invention.

FIG. 10 depicts an alternative embodiment, which can be used to obtain "unsharp masking" data density improvement. In this figure, laser light from blue laser diode 260 is collimated by lens 262 into beam splitter 264. A portion of the light is focussed by lens 266 onto data storage medium 268 (as above). Return light is directed by beam splitter 264 through beam compressor 270; then, both true confocal light 272 and near confocal light 274 are focussed by lens 276 into silica fiber 278. Again, confocal return light exits fiber 278 and is detected by photodetector 282, while higher modes are stripped out by higher refractive index cladding 280 and detected by photodetector 284. In this way, "unsharp masking" data density improvement can be obtained by subtracting a part of the output of photodetector 284 from the output of photodetector 282.

Figure 11:
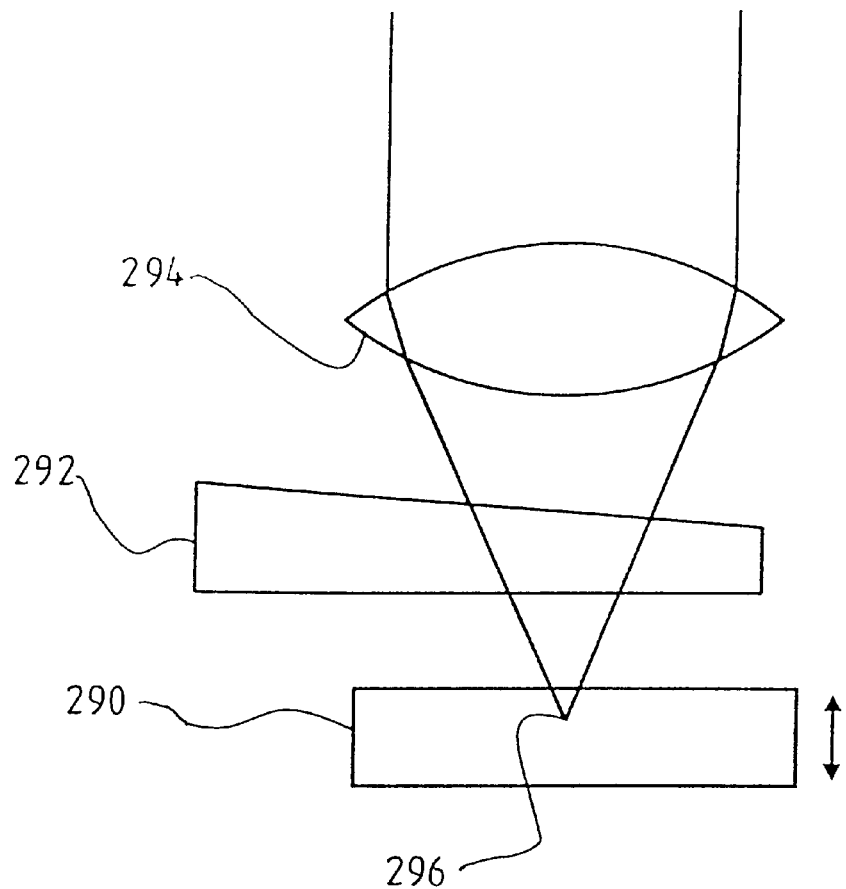
FIG. 11 is a schematic view of an apparatus for use with the apparatus of FIG. 9 or FIG. 10, for compensating for spherical aberration on focussing into an optical data storage medium.

FIG. 11 depicts an apparatus for use with the apparatuses of FIGS. 9 and 10, for compensating for spherical aberration on focussing into the optical data storage medium or material. In this figure, light from optical data storage medium 290 passes through glass optical wedge 292; the optical data is then "read" by lens 294. As the focussed "reading" spot 296 moves deeper into the medium 290, the wedge 292 is moved to the left (in this view) so that a thinner portion of wedge 292 is in the beam path, thereby keeping the optical path effectively constant.

Modifications within the spirit and scope of the invention may readily be effected by persons skilled in the art, so it is to be understood that this invention is not limited to the particular embodiments described by way of example hereinabove. For example, it should particularly be noted that any reference to microscopy or to endoscopy is intended also to refer to endomicroscopy.

I claim:

1. A method of image sharpening in a confocal microscopy or endoscopy observation, comprising:
    collecting true confocal return light emanating from an observational field of an object;
    focussing said true confocal return light into a core of a fiber wave-guide;
    collecting near confocal return light from a volume partially overlapping said observational field and thereby defining an overlap volume;
    focussing said near confocal return light into said fiber wave-guide so as to be transmitted principally in a cladding of said fiber wave-guide;
    separately detecting said true confocal return light and said near confocal return light to produce a true confocal output signal and a near confocal output signal; and
    adjusting said true confocal output signal on the basis of said near confocal output signal to substantially eliminate from said true confocal output signal a component due to said near confocal output signal;
    whereby the effective volume of said observational field is reduced and the resolution of said observation is effectively increased.

2. A method as claimed in claim 1, wherein said overlap volume is in the Z axis of said observational field.

3. A method as claimed in claim 1, wherein said true confocal return light and said near confocal return light are collected and focussed by means of a light condenser.

4. A method as claimed in claim 3, wherein said light condenser comprises a lens or a compound lens.

5. A method as claimed in claim 1, wherein adjusting said true confocal output signal comprises subtracting said near confocal output signal from said true confocal output signal.

6. A method as claimed in claim 1, including absorbing or otherwise excluding higher angle rays from said near confocal return light, whereby said near confocal return light comprises principally light from said overlap volume.

7. A method as claimed in claim 6, including excluding higher angle rays from said near confocal return light by transmitting said near confocal return light through a region of said fiber provided with an outer cladding with a refractive index such that said higher angle rays are transmitted into said outer cladding while lower angle rays of said near confocal light are internally reflected and thereby retained in a glass inner cladding of said fiber.

8. A method as claimed in claim 7, including absorbing light transmitted within said outer cladding.

9. A method as claimed in claim 6, wherein said fiber is a single moded optic fiber with a glass inner cladding and an outer cladding having a low refractive index such that modes of said near confocal return light in said glass cladding are normally internally reflected by said outer cladding, wherein said method includes cooling said outer cladding within a region of said fiber so that within said region said higher angle rays are transmitted into said outer cladding.

10. A method as claimed in claim 9, wherein said outer cladding comprises silicone rubber.

11. A method as claimed in claim 7, wherein said outer cladding is surrounded at least partially within said region with an optically absorbing medium.

12. A method as claimed in claim 9, including cooling said outer cladding within said region by means of a Peltier effect cooler.

13. A method as claimed in claim 1, wherein said object is a data storage medium.

14. An image sharpening apparatus for use in making a confocal microscopy or endoscopy observation, comprising:
    a light condenser for collecting true confocal return light emanating from an observational field of an object, for focussing said true confocal return light into a core of a fiber wave-guide, for collecting near confocal return light from a volume partially overlapping said observational field and thereby defining an overlap volume, and for focussing said near confocal return light into said fiber wave-guide so as to be transmitted principally in a cladding of said fiber wave-guide;
    detection means for detecting said true confocal return light and said near confocal return light, and to produce respectively a true confocal output signal and a near confocal output signal; and
    signal processing means for adjusting said true confocal output signal on the basis of said near confocal output signal to substantially eliminate from said true confocal output signal a component due to said near confocal output signal;
    whereby the effective volume of said observational field is reduced and the resolution of said observation is effectively increased.

15. An apparatus as claimed in claim 14, wherein said overlap volume is in the Z axis of said observational field.

16. An apparatus as claimed in claim 14, wherein said light condenser comprises a first light condenser and a second light condenser, wherein said first light condenser is arranged to collect and focus said true confocal return light and a second light condenser is arranged to collect and focus said near confocal return light.

17. An apparatus as claimed in claim 15, wherein said light condenser comprises a lens or a compound lens.

18. An apparatus as claimed in claim 14, wherein said detection means comprises a first detector and a second detector, wherein said first detector is arranged to detect said true confocal return light and said second detector is arranged to detect said near confocal return light.

19. An apparatus as claimed in claim 14, wherein said signal processing means is operable to adjust said true confocal output signal by subtracting said near confocal output signal from said true confocal output signal.

20. An apparatus as claimed in claim 14, including absorption means for extracting and absorbing higher angle rays from said near confocal return light, whereby said near confocal return light comprises principally light from said overlap volume.

21. An apparatus as claimed in claim 14, wherein said fiber has an glass inner cladding and a region provided with an outer cladding with a refractive index such that within said region higher angle rays of said near confocal return light are transmitted into said outer cladding while lower angle rays of said near confocal light are internally reflected and thereby retained in said glass cladding.

22. An apparatus as claimed in claim 14, wherein said fiber is a single moded optic fiber with a glass inner cladding and an outer cladding having a low refractive index such that modes of said near confocal return light in said glass cladding are normally internally reflected by said outer cladding, wherein said apparatus includes means for increasing said refractive index of said outer cladding within a region of said fiber so that within said region said higher angle rays are transmitted into said outer cladding.

23. An apparatus as claimed in claim 22, wherein said outer cladding comprises silicone rubber.

24. An apparatus as claimed in claim 21, wherein said outer cladding is surrounded at least partially within said region with an optically absorbing medium.

25. An apparatus as claimed in claim 22, wherein said means for increasing said refractive index of said outer cladding within a region comprises a cooling means.

26. An apparatus as claimed in claim 25, wherein said cooling means comprises a Peltier effect cooler.

27. An apparatus as claimed in claim 14, wherein said apparatus includes optical path varying means for varying the optical path of said true and near confocal return light to compensate for variations in said optical path due to changes in the depth of said observational field within said object, said optical path varying means having regions of greater and lesser optical path, whereby said optical path varying means can be located with a region of lesser optical path in said optical path when said observational field is deep within said object and with a region of greater optical path in said optical path when said observational field is less deep within said object.

28. An apparatus as claimed in claim 27, wherein said optical path varying means comprises an optical wedge.

29. A method of reading data from a data storage medium, including the method of image sharpening in a confocal microscopy or endoscopy observation as claimed in claim 1.

30. A data reading apparatus for reading data from a data storage medium, including an image sharpening apparatus as claimed in claim 14.

* * * * *